(12) United States Patent
Cho et al.

(10) Patent No.: US 7,727,653 B2
(45) Date of Patent: Jun. 1, 2010

(54) POLYMER ELECTROLYTE MEMBRANE AND FUEL CELL USING THE SAME

(75) Inventors: Chung-kun Cho, Suwon-si (KR); Doo-yeon Lee, Yongin-si (KR); Hee-young Sun, Yongin-si (KR)

(73) Assignee: Samsung SDI Co., Ltd., Suwon-si (KR)

( * ) Notice: Subject to any disclaimer, the term of this patent is extended or adjusted under 35 U.S.C. 154(b) by 1074 days.

(21) Appl. No.: 11/340,565

(22) Filed: Jan. 27, 2006

(65) Prior Publication Data

US 2006/0172170 A1    Aug. 3, 2006

(30) Foreign Application Priority Data

Jan. 28, 2005    (KR)    ............ 10-2005-0008001

(51) Int. Cl.
  *H01M 8/10*    (2006.01)
(52) U.S. Cl. .............. 429/33; 429/34; 521/27
(58) Field of Classification Search ........ 429/34, 429/33; 521/27
  See application file for complete search history.

(56) References Cited

U.S. PATENT DOCUMENTS 5,525,436 A    6/1996   Savinelle et al.

2004/0062969 A1*  4/2004  Sakaguchi et al. ........... 429/33
2004/0191602 A1   9/2004  Ishikawa et al.

FOREIGN PATENT DOCUMENTS

| JP | 2004-10631 | 1/2004 |
| KR | 2003-32321 | 4/2003 |
| KR | 2004-48914 | 6/2004 |
| WO | WO 02/38650 | 5/2002 |
| WO | WO 03/033566 | 4/2003 |
| WO | WO 2005/007725 | 1/2005 |

OTHER PUBLICATIONS

Office Action issued in Korean Patent Application No. 2005-8001 on May 25, 2006.
Office Action issued in corresponding Chinese Patent Application No. 2006100061852 dated Sep. 28, 2007.
Japanese Office Action dated Sep. 29, 2009.

* cited by examiner

*Primary Examiner*—Jane Rhee
(74) *Attorney, Agent, or Firm*—Stein McEwen, LLP

(57) ABSTRACT

A polymer electrolyte membrane includes a poly(benzoxazole) polymer doped with at least one acid. The polymer electrolyte membrane is manufactured by impregnating poly(benzoxazole) with an acid and has better ionic conductivity at high temperatures and better mechanical properties than a conventional poly(benzoxazole) polymer electrolyte membrane. In addition, the polymer electrolyte membrane has equivalent thermal stability to a conventional polymer electrolyte membrane.

19 Claims, 3 Drawing Sheets

POLYMER ELECTROLYTE MEMBRANE AND FUEL CELL USING THE SAME

CROSS-REFERENCE TO RELATED APPLICATIONS

This application claims the benefit of Korean Patent Application No. 2005-8001, filed Jan. 28, 2005, in the Korean Intellectual Property Office, the disclosure of which is incorporated herein by reference.

BACKGROUND OF THE INVENTION

1. Field of the Invention

Aspects of the present invention relate to a polymer electrolyte membrane and a fuel cell using the same, and more particularly, to a polymer electrolyte membrane having excellent ionic conductivity at high temperatures, excellent mechanical characteristics, and thermal stability equivalent to that of a conventional poly(benzoxazole) polymer electrolyte membrane, and a fuel cell using the same.

2. Description of the Related Art

A fuel cell is a power generating system in which chemical energy produced in a chemical reaction between hydrogen and oxygen contained in a hydrocarbon material, such as methanol, ethanol, or a natural gas, is converted directly into electrical energy.

Fuel cells are categorized into phosphoric acid fuel cells, molten carbonate fuel cells, solid oxide fuel cells, polymer electrolyte membrane fuel cells (PEMFCs), alkali fuel cells, and the like. Although these fuel cells operate based on the same principle, the different types of fuel cells differ in terms of fuel, operation temperatures, catalysts, electrolytes, and the like.

PEMFCs have excellent energy generating characteristics in comparison to the other fuel cells mentioned above, and can operate at a low temperature, have a short start-up time, and respond quickly. A PEMFC can be used as, for example, a portable power source for cars, a distribution power source for homes and public places, or a small power source for electrical devices.

A PEMFC generally includes a polymer electrolyte membrane composed of a sulfonate perfluoro polymer (for example: NAFION obtained from Dupont Inc.) having a backbone of a fluorinated alkylene and a side chain of a sulfonic acid-terminated fluorinated vinyl ether. Such a polymer electrolyte membrane has excellent ionic conductivity when impregnated with a proper amount of water.

In a PEMFC including such a polymer electrolyte membrane, protons generated at an anode move to a cathode. When this happens, the protons are accompanied by water due to osmotic drag, so that the anode side of the polymer electrolyte membrane becomes dried, thus dramatically decreasing the proton conductivity of the polymer electrolyte membrane. Under these conditions, the PEMFC may fail to operate. In addition, when the operation temperature of the PEMFC is about 80° C. or greater, the polymer electrolyte membrane is further dried due to vaporization of water, and thus the proton conductivity of the polymer electrolyte membrane rapidly decreases.

Because of the tendency for the polymer electrolyte membrane to become dried at higher temperatures, a conventional PEMFC typically operates at 100° C. or less, for example at about 80° C. However, at such a low operation temperature of about 100° C. or less, other problems may result. For example, a hydrogen-rich gas, which is a fuel for the PEMFC, is obtained by modifying natural gas or an organic fuel, such as methanol. The hydrogen rich gas typically contains carbon dioxide and carbon monoxide as side products, and carbon monoxide can poison a catalyst contained in an anode. When this happens, the electrochemical activity of the poisoned catalyst is dramatically decreased, thus decreasing the operating efficiency and lifetime of the PEMFC. Such poisoning is more likely to occur as the operation temperature is decreased.

When the PEMFC operates at about 150° C. or greater, catalyst poisoning due to carbon monoxide can be prevented, the activity of the catalyst is increased, and the water management of the PEMFC can be more easily controlled. As a result, the volume of fuel reformer can be reduced and a cooling device can be simplified, and thus, the entire PEMFC energy generating system can be made smaller. However, as discussed above, when a conventional electrolyte membrane comprising a polymer electrolyte such as NAFION is used, the performance is substantially decreased due to the evaporation of water at high temperatures, and thus, operation of the PEMFC becomes almost impossible. Due to these problems, the need for a PEMFC that can operate at high temperatures has drawn much attention.

Many methods of manufacturing a PEMFC that can operate at high temperature have been developed.

For example, the use of polybenzimidazole (PBI) is disclosed in U.S. Pat. No. 5,525,436. This method is commonly used and has many advantages including operation at about 200° C. and thus substantially less catalyst poisoning due to carbon monoxide, excellent oxidation stability, and excellent thermal stability.

However, PBI has room for improvement in terms of mechanical strength, ionic conductivity, and the like. In particular, PBI is typically doped with phosphoric acid, and the doping level of the phosphoric acid is directly related to the ionic conductivity of the polymer electrolyte membrane. However, when the doping level of the phosphoric acid doped in PBI exceeds 800%, the PBI electrolyte membrane fails to retain its form, and thus the manufacturing of the PEMFC becomes complex and the ionic conductivity becomes limited.

In order to avoid the limitations of PBI, the use of poly (benzoxazole) in a PEMFC has been suggested. However, it is necessary to improve the impregnating procedure of poly (benzoxazole) because it is difficult to impregnate poly(benzoxazole) with a phosphoric acid using conventional methods.

SUMMARY OF THE INVENTION

Aspects of the present invention provide a poly(benzoxazole) polymer electrolyte membrane with excellent ionic conductivity at high temperatures, excellent mechanical strength, and excellent thermal stability.

The present invention also provides a method of manufacturing the polymer electrolyte membrane.

Aspects of the present invention also provide a high-efficiency fuel cell including the polymer electrolyte membrane.

Additional aspects and/or advantages of the invention will be set forth in part in the description which follows and, in part, will be obvious from the description, or may be learned by practice of the invention.

According to an aspect of the present invention, there is provided a polymer electrolyte membrane including a compound that is represented by formula 1a or formula 1b and doped with at least one acid.

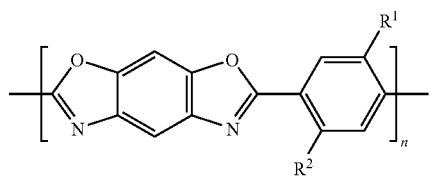

[Formula 1a]

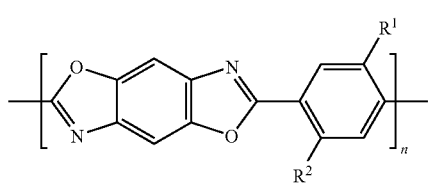

[Formula 1b]

where $R^1$ and $R^2$ are each independently hydrogen atom, a $C_{1-40}$ alkyl group, a $C_{6-20}$ aryl group, a $C_{1-10}$ alkoxy group, a $C_{7-40}$ alkylaryl group, a $C_{7-40}$ arylalkyl group, a $C_{2-20}$ alkenyl group, a $C_{8-40}$ arylalkenyl, a $C_{2-10}$ alkynyl, a hydroxyl group, a nitro group, or an amino group; and n is an integer between 10 and 100,000.

According to another aspect of the present invention, there is provided a method of manufacturing a polymer electrolyte membrane, the method including: dissolving a polymer compound represented by formula 1a or formula 1b in a liquid mixture of a high-volatility liquid having a boiling point of 100° C. or less and a low-volatility liquid having a boiling point greater than 100° C.; coating the polymer liquid mixture on a support; removing the high-volatility liquid from the coating product to form a polymer film; and immersing the polymer film in an acid.

According to yet another aspect of the present invention, there is provided a fuel battery including: a cathode including a catalyst layer and a diffusion layer; an anode including a catalyst layer and a diffusion layer; and a polymer electrolyte membrane interposed between the cathode and the anode, wherein the polymer electrolyte membrane is the polymer electrolyte membrane according to an aspect of the present invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
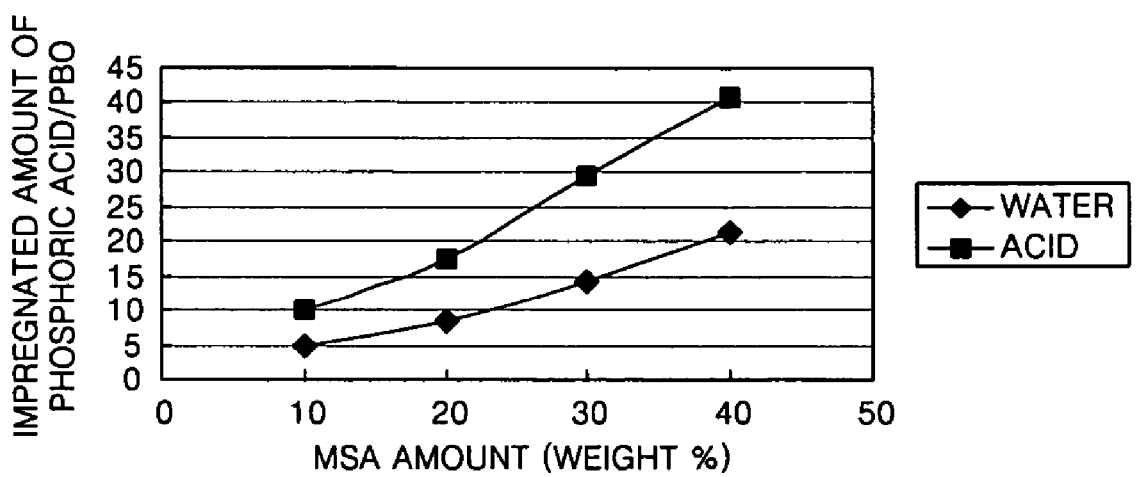
FIG. 1 is a graph of the amount of phosphoric acid impregnated in a polymer electrolyte membrane with respect to initial amounts of methanesulfonic acid according to Examples 1 through 4.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

A polymer electrolyte membrane according to an embodiment of the present invention includes a polymer represented by formula 1a or formula 1b, and is doped with at least one acid at a doping level in the range of 600 to 6000%.

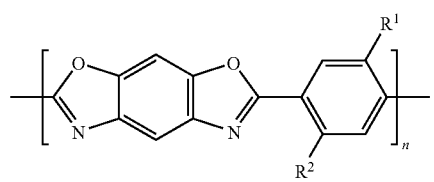

[Formula 1a]

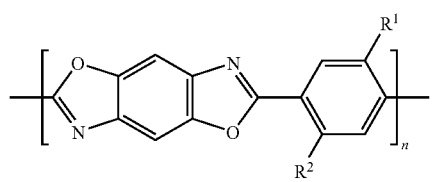

[Formula 1b]

where $R^1$ and $R^2$ are each independently a hydrogen atom, a $C_{1-40}$ alkyl group, a $C_{6-20}$ aryl group, a $C_{1-10}$ alkoxy group, a $C_{7-40}$ alkylaryl group, a $C_{7-40}$ arylalkyl group, a $C_{2-20}$ alkenyl group, a $C_{8-40}$ arylalkenyl, a $C_{2-10}$ alkynyl, a hydroxyl group, a nitro group, or an amino group; and n is an integer between 10 and 100,000.

The polymer electrolyte membrane manufactured using the polymer represented by formula 1a or formula 1b has excellent mechanical strength because benzene is combined with the benzoxazole moiety in the para position.

In particular, when the substituent in the polymer represented by formula 1a or 1b is an alkyl group or an alkoxy group, the solubility of the polymer in a solvent is increased and the viscosity of the polymer is decreased, thus resulting in easier manufacturing. When the substituent is a hydroxyl group or an amine group, the polymer can be easily combined with a phosphoric acid to form a complex and the ability to retain the phosphoric acid is increased.

The doping level refers to the amount of acid contained in the polymer of the polymer electrolyte membrane. The doping level (%) is given by dividing the number of acid molecules contained in the polymer of the polymer electrolyte membrane by the number of repeat units. For example, when a polymer has 100 repeat units and 200 acid molecules, the doping level is 200%.

The doping level is closely related to the ionic conductivity of the polymer electrolyte membrane. That is, as the doping level increases, the amount of acid acting as an ion conducting material increases, and thus, the ionic conductivity of the polymer electrolyte membrane is increased. Accordingly, there have been many attempts to increase the doping level of polymer electrolyte membranes to increase the ionic conductivity.

If the repeat unit of the polymer of the polymer electrolyte membrane has many sites to which an acid can bond, the doping level can be easily increased. The poly(benzoxasole) according to an embodiment of the present invention has at least four sites to which an acid can bond. In addition, the number of the sites to which the acid can bond can be increased by selecting an appropriate substituent. Accordingly, the ability to retain phosphoric acid and ionic conductivity can be increased.

The doping level of the polymer electrolyte membrane may be in the range of 600 to 6000%. When the doping level is less than 600%, sufficient ionic conductivity cannot be obtained. When the doping level is greater than 6000%, the mechanical strength of the polymer is decreased and the polymer electrolyte membrane becomes easily deformed.

The acid may be sulfuric acid, a derivative of sulfuric acid, phosphoric acid, a derivative of phosphoric acid, or a mixture of these, but is not limited thereto. That is, any acid that has ionic conductivity can be used. Preferably, though not necessarily, the acid is phosphoric acid or a derivative of phosphoric acid. The selection of a derivative of sulfuric acid or phosphoric acid is not critical and can be any derivative of sulfuric acid or phosphoric acid that provides ionic conductivity to the polymer. As specific non-limiting examples, the phosphoric acid derivative may be a compound of formulas (I)-(IV), and the sulfuric acid derivative may be a compound of formula (V):

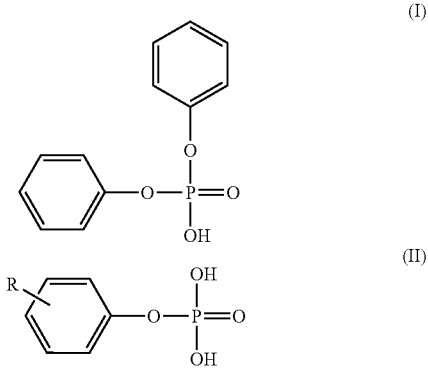

wherein R is hydrogen, C1-C10 alkyl group, or C6-C20 aryl group.

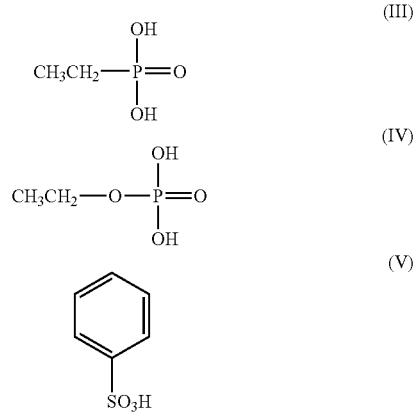

In addition, the polymer electrolyte membrane may further include methanesulfonic acid. The use of methanesulfonic acid may increase the ionic conductivity of the polymer electrolyte membrane because methanesulfonic acid has a strong acidity. The amount of methanesulfonic acid may be in the range of 0.001 to 10 parts by weight, preferably, 0.005 to 1 parts by weight, and more preferably, 0.01 to 0.3 parts by weight, based on 100 parts by weight of the polymer electrolyte membrane.

When the amount of methansulfonic acid is less than 0.001 parts by weight based on 100 parts by weight of the polymer electrolyte membrane, the ionic conductivity is not increased. When the amount of the methansulfonic acid is greater than 10 parts by weight based on 100 parts by weight of the polymer electrolyte membrane, the physical properties of the polymer electrolyte membrane deteriorate.

A method of manufacturing the polymer electrolyte membrane will now be described in detail.

First, a high-volatile liquid and a low-volatile liquid are mixed to produce a liquid mixture which is able to dissolve at least one of polymers represented by formula 1a or formula 1b. The polymers represented by formula 1a and formula 1b are referred to hereinafter by the term poly(benzoxazole). The high-volatility liquid and the low-volatility liquid are selected so that at least one of them can dissolve the poly(benzoxazole). When only one of the high-volatility liquid and the low-volatility liquid can dissolve the poly(benzoxazole) and the amount of the poly(benzoxazole) soluble liquid is less than a predetermined critical amount, the poly(benzoxazole) does not dissolve in the liquid mixture. Therefore, in this case, the amount of the liquid which is able to dissolve the poly(benzoxazole) must be the critical amount or greater.

The high-volatility liquid has a boiling point of 100° C. or less and has a volatility relatively greater than that of the low-volatility liquid. The high-volatility liquid may be trifluoracetic acid, acetone, tetrahydrofuran, or a mixture of these, but is not limited thereto. Preferably, though not necessarily, the high-volatility liquid is trifluoracetic acid.

The low-volatility liquid has a boiling point of 100° C. or greater and has a volatility relatively lower than that of the high-volatility liquid. The low-volatility liquid may be dimethyl formamide (DMF), n-methylpyrrolidone (NMP), dimethylacetamide (DMAc), dimethyl sulfoxide (DMSO), methanesulfonic acid (MSA), or a mixture of these, but is not limited thereto. Preferably, the low-volatility liquid is MSA.

It is possible to select the high-volatility liquid and the low-volatility liquid such that the high-volatility liquid can dissolve poly(benzoxazole), but the low-volatility liquid cannot dissolve poly(benzoxazole); or such that the low-volatility liquid can dissolve poly(benzoxazole), but the high-volatility liquid cannot dissolve poly(benzoxazole).

When the high-volatility liquid can dissolve poly(benzoxazole) and the low-volatility liquid cannot dissolve poly(benzoxazole), phase separation occurs in a drying process, and thus, a pore is formed in a film. On the other hand, when the low-volatility liquid can dissolve poly(benzoxazole) and the high-volatility liquid cannot dissolve poly(benzoxazole), phase separation does not occur in the drying process, and thus, a uniform film can be obtained. However, when poly(benzoxazole) is dissolved only by the low-volatility liquid, the viscosity may be too high and thus, treatment of the product may be difficult.

Accordingly, a preferred combination is a mixture of a low-volatility liquid that can dissolve poly(benzoxazole) and a high-volatility liquid that cannot dissolve poly(benzoxazole). In addition, as described above, even when the liquid mixture contains a liquid that can dissolve poly(benzoxazole), poly(benzoxazole) cannot be dissolved in the liquid mixture if the amount of the liquid is less than a critical amount thereof. Therefore, the amount of the low-volatility liquid must be the critical amount or greater. In consideration of the critical amount, the weight ratio of the low-volatility liquid to the high-volatility liquid may be in the range of 1:9 to 3:7. When the amount of the low-volatility liquid with respect to the high-volatility liquid is outside this range and too small, poly(benzoxazole) cannot be dissolved in the liquid mixture. When the amount of the low-volatility liquid with respect to the high-volatility liquid is outside this range and too large, the low-volatility liquid remains in the polymer electrolyte membrane and thus the physical properties of the polymer electrolyte membrane is deteriorated.

In addition, the weight ratio of the poly(benzoxazole) polymer to the low-volatility liquid may be in the range of 1:5 to 1:60. When the amount of the poly(benzoxazole) polymer with respect to the low-volatility liquid is outside this range and too large, the amount of the impregnated acid is too large, and the mechanical strength of the polymer electrolyte membrane is decreased. When the amount of the poly(benzoxazole) polymer is outside this range and too small, the amount of the impregnated acid is too small, and ionic conductivity is decreased.

The high-volatility liquid can be mixed with the low-volatility liquid at any temperature and using any methods in which the liquids are mixed uniformly.

Then, poly(benzoxazole) is dissolved in the liquid mixture, thus forming a polymer liquid mixture in which poly(benzoxazole) is uniformly distributed in the liquid mixture.

The polymer liquid mixture in which poly(benzoxazole) is uniformly distributed is coated on a support such that a uniform film is formed. The coating may be performed using any methods commonly known in the art. Examples of the coating method include knife coating, direct roll coating, reverse roll coating, gravure roll coating, gap coating, spraying, slot die coating, and the like.

The support to be coated may be a polymer film of polyamide, polyimide, polyolefin, polyester, polyacetal, polycarbonate, polysulfone, polyvinylchloride, ethylene vinylalcohol, ethylene vinylacetate, or the like, but is not limited thereto. Preferably, though not necessarily, the support to be coated is a polyester film. The thickness of the support may be in the range of 5 to 500 µm. When the thickness of the support is greater than 500 µm, tension is increased in the manufacturing process and thus processablity is decreased. In addition, in order to obtain easy separation of the polymer electrolyte membrane from the support, a releasing agent can be coated to a small thickness on the support before the coating of the polymer liquid mixture.

The high-volatility liquid is removed from the polymer solution distributed in the film by using various methods, preferably, drying. When the high-volatility liquid is removed by drying, the drying rate can be controlled by adjusting the air pressure.

The high-volatility liquid can be removed by drying at room temperature. Preferably, though not necessarily, the drying temperature is in the range of 50° C. to 90° C. When the drying temperature is less than 50° C., it takes a long time to completely remove the high-volatility liquid, and the dryness is insufficient. When the drying temperature is greater than 90° C., the low-volatility liquid is also vaporized, and thus pores can be formed in the polymer electrolyte membrane. Therefore, even within this range, the drying temperature should be slightly lower than the boiling point of the high-volatility liquid.

The polymer liquid mixture coated onto the support may be dried for 1 to 3 hours. When the drying time is less than 1 hour, the dryness is insufficient and thus physical properties are not good. When the drying time is longer than 3 hours, the manufacturing costs increase.

When the high-volatility liquid is removed, a polymer film containing the low-volatility liquid is obtained. Then, the polymer film is impregnated with an acid by immersing the polymer film in the acid.

The acid may be a sulfuric acid, a derivative of sulfuric acid, a phosphoric acid, a derivative of phosphoric acid, or a mixture of these, but is not limited thereto. That is, any acid that has ionic conductivity can be used in the present embodiment. Preferably, though not necessarily, the acid is phosphoric acid or a derivative of phosphoric acid.

Before being immersed in the acid, the polymer film can be immersed in a liquid with a low viscosity. This is desirable because if the dried polymer film is instead directly immersed in an acid-containing bath, the acid-containing immersion bath can be contaminated by the low-volatility liquid, which is not desirable in terms of commercial application. Accordingly, before the polymer film is immersed in the acid-containing immersion bath, the low-volatility liquid may be exchanged with a low viscosity liquid, and the low-volatility liquid may be removed in the low viscosity liquid bath. The low viscosity liquid is then exchanged with an acid in the acid-containing immersion bath.

The liquid with low viscosity may be an alcohol, such as methanol, ethanol, isopropylalcohol, n-propylalcohol, butyl alcohol or the like, or water, but is not limited thereto. Preferably, though not necessarily, the liquid with low viscosity is methanol or water.

A fuel cell including the polymer electrolyte membrane can be manufactured. The fuel cell will be described in detail.

The fuel cell includes a cathode that includes a catalyst layer and a diffusion layer, an anode that includes a catalyst layer and a diffusion layer, and a polymer electrolyte membrane interposed between the cathode and the anode. The fuel cell can be manufactured using methods that are commonly known in the art. The polymer electrolyte membrane according to an embodiment of the present invention can be used as the polymer electrolyte membrane.

The structure and effect of the present invention will now be described in detail with reference to the following examples. The examples are provided for illustrative purposes only and should not be construed as limiting the scope of the present invention.

Example 1

0.1 g of poly(benzoxazole) was dissolved in 20 g of a liquid mixture of methanesulfonic acid and trifluoracetic acid in a weight ratio of 1:9, thus forming a polymer solution. The poly(benzoxazole) was poly(p-phenylene-2,6-benzobisoxazole represented by Formula 1a.

The polymer solution was cast on a PET film and dried at 60° C. for 1 hour to remove the trifluoracetic acid. The dried film was immersed in water for 4 hours. Then, the surface of the polymer film was wiped well using a piece of tissue and the weight of the wiped polymer film was measured to obtain a ratio of water to poly(benzoxazole). The polymer film was immersed in phosphoric acid for 12 hours to form a polymer electrolyte membrane. Then, the polymer electrolyte membrane was removed from the phosphoric acid and the weight of the polymer electrolyte membrane was measured to obtain the ratio of phosphoric acid to polybenzoxazole. This result was used to measure the doping level, which is shown in Table 1.

Example 2

A polymer electrolyte membrane was manufactured in the same manner as in Example 1, except that the weight ratio of methanesulfonic acid to trifluoracetic acid was 2:8. Then, the doping level was measured in the same manner as in Example 1 and the result is shown in Table 1.

Example 3

A polymer electrolyte membrane was manufactured in the same manner as in Example 1, except that the weight ratio of methanesulfonic acid to trifluoracetic acid was 3:7. Then, the doping level was measured in the same manner as in Example 1 and the result is shown in Table 1.

Example 4

A polymer electrolyte membrane was manufactured in the same manner as in Example 1 except that the weight ratio of methanesulfonic acid to trifluoracetic acid was 4:6. Then, the doping level was measured in the same manner as in Example 1 and the result is shown in Table 1.

TABLE 1

|  | Example 1 | Example 2 | Example 3 | Example 4 |
|---|---|---|---|---|
| Doping level (%) | 2010 | 3573 | 5989 | 8263 |

The polymer electrolyte membranes manufactured according to Example 1 through 3 had better mechanical strength than the polymer electrolyte membrane manufactured according to Example 4.

The ratios of phosphoric acid/poly(benzoxazle) are shown in FIG. 1. Referring to FIG. 1, the amount of phosphoric acid contained in the polymer electrolyte membrane varied according to the amount of MSA that was present in the liquid mixture.

The polymer electrolyte membrane manufactured according to Example 1 was immersed in a larger amount of fresh 85% phosphoric acid and then placed in an oven at 150° C. for 8 hours. It was observed that the poly(benzoxazole film) did not dissolve in the 85% phosphoric acid

Comparative Example 1

A 35 μm-thick polybenzimidazole (PBI) film that was manufactured using a PBI solution obtained from Narazaki Sangyo Co. was immersed in 85% phosphoric acid for 12 hours and then immersed again in a large amount of fresh 85% phosphoric acid and placed in an oven at 150° C. After two and a half hours, the PBI film was completely dissolved in the phosphoric acid.

Figure 2:
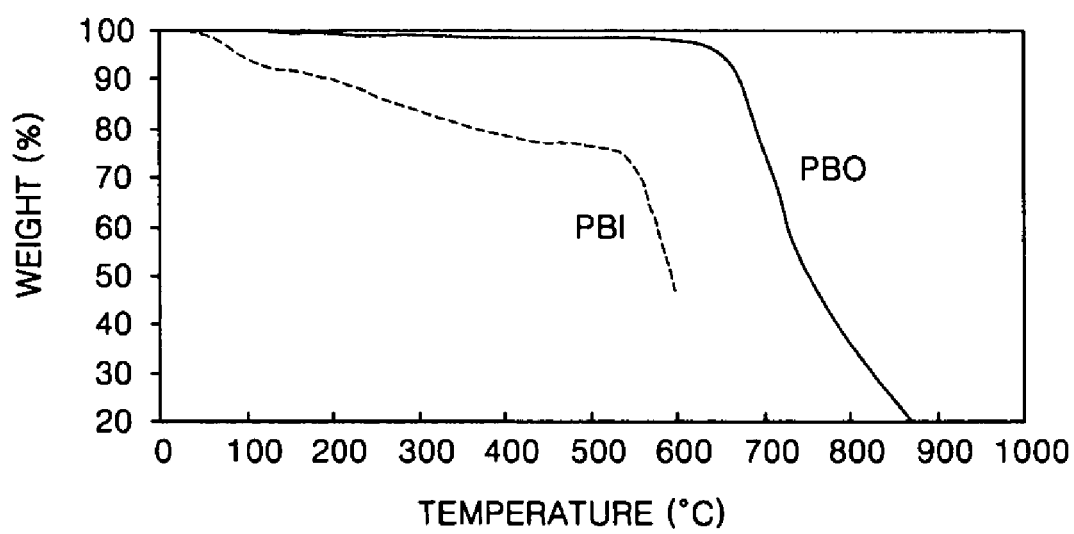
FIG. 2 illustrates the results of TGA performed on the polymer electrolyte membranes according to Example 1 and Comparative Example 1.

Thermal decomposition temperatures of the polymer film according to Example 1 and the PBI film according to Comparative Example 1 were measured using thermogravimetric analysis (TGA) as the temperature was increased by 10° C. per minute in air. The results are shown in FIG. 2. In addition, the measured thermal decomposition temperatures are shown in Table 2.

After doping the polymer electrolyte membrane according to Example 1 and the PBI membrane according to Comparative Example 1 with phosphoric acid, thermal decomposition temperatures of the polymer electrolyte film according to Example 1 and the PBI membrane according to Comparative Example 1 were measured using TGA in which the temperature was increased by 10° C. per minute in air. The measured thermal decomposition temperatures are shown in Table 2.

TABLE 2

|  | (Example 1) poly(benzoxazole)(° C.) | (Comparative Example 1) poly(benzimidazole)(° C.) |
|---|---|---|
| Before doping with phosphoric acid | 663.7 | 552.8 |
| After doping with phosphoric acid | 625.6 | 623.5 |

Referring to Table 2, the thermal decomposition temperature of the polymer film according to Example 1 decreased after the doping with phosphoric acid, and the thermal decomposition temperature of the PBI film according to Comparative Example 1 increased after the doping with phosphoric acid. However, after the doping with phosphoric acid, the polymer film according to Example 1 and the PBI film decomposed at almost the same temperature.

As such, it was confirmed that the polymer electrolyte membrane doped with phosphoric acid according to Example 1 had excellent thermal stability.

Example 5

A polymer electrolyte membrane was manufactured in the same manner as in Example 1 except that the drying time was 2 hours.

Example 6

A polymer electrolyte membrane was manufactured in the same manner as in Example 1 except that the drying time was 3 hours.

Comparative Example 2

A 35 μm thick PBI electrolyte membrane was immersed in 85% phosphoric acid at 60° C. for 30 minutes until the doping level was 750%.

Ionic conductivity with respect to temperature of the polymer electrolyte membranes according to Examples 1, 3, 5 and 6, and Comparative Example 2 was measured using an impedance analyzer. The results are shown in FIG. 3.

Ionic conductivity with respect to time of the polymer electrolyte membranes according to Examples 1, 3, 5 and 6, and Comparative Example 2 was also measured using an impedance analyzer. The results are shown in FIG. 4.

Figure 3:
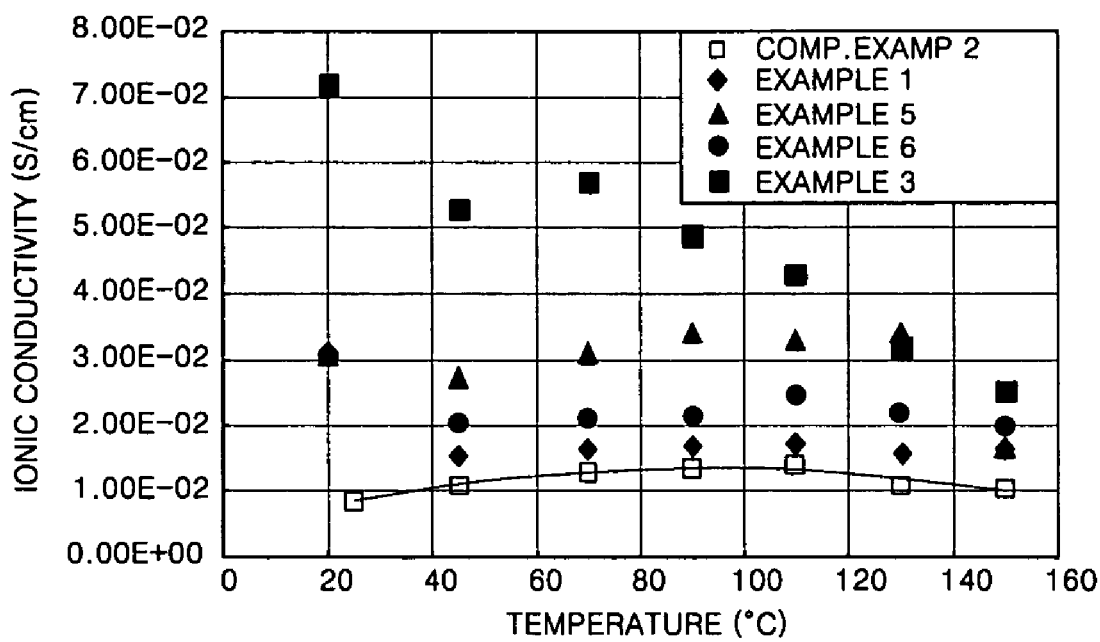
FIG. 3 is a graph of ionic conductivity with respect to temperature of the polymer electrolyte membranes according to Examples 1, 3, 5, and 6 and Comparative Example 2.
Figure 4:
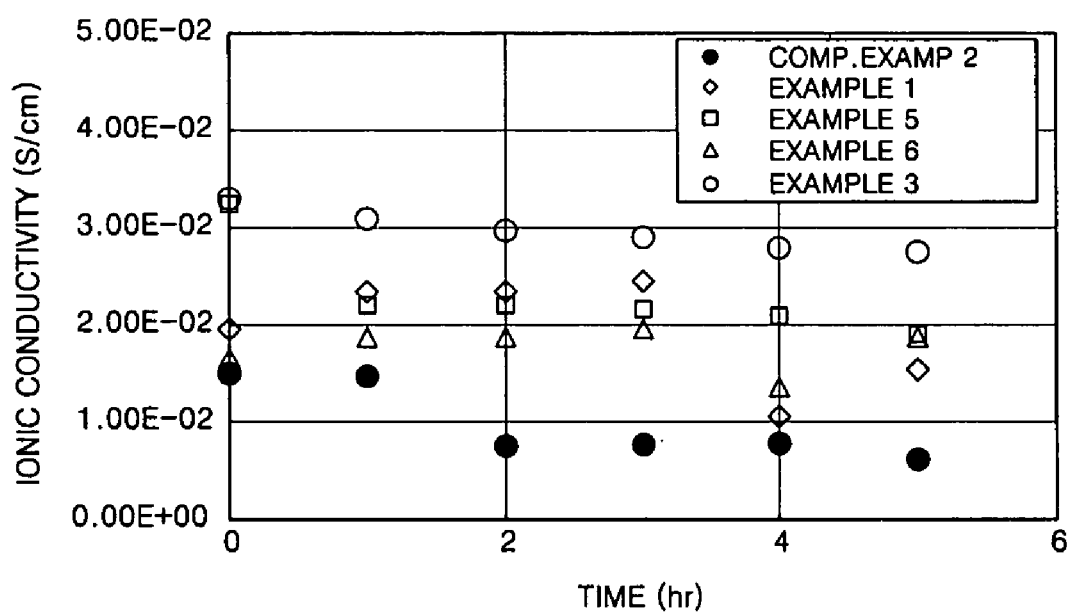
FIG. 4 is a graph of ionic conductivity with respect to time of the polymer electrolyte membranes according to Examples 1, 3, 5, and 6 and Comparative Example 2.

Referring to FIGS. 3 and 4, the polymer electrolyte membranes according to embodiments of the present invention exhibited better ionic conductivity with respect to the operation temperature and time than the conventional PBI electrolyte membrane doped with phosphoric acid. However, a decrease in the ionic conductivity as the temperature increased, as illustrated in FIG. 3, resulted from the evaporation of water due to the use of 85% phosphoric acid.

The amounts of phosphoric acid impregnated per unit mass of poly(benzoxazole) contained in the polymer electrolyte membranes according to Example 1 and Comparative Example 2, were 9.9 g and 2.4 g, respectively. Each of the polymer electrolyte membranes was cut to a size of 15.5×80× 0.065 mm to form a sample and the mechanical strengths thereof were measured using an INSTRON universal test machine (UTM) at a cross head speed of 10 mm/minutes.

Figure 5:
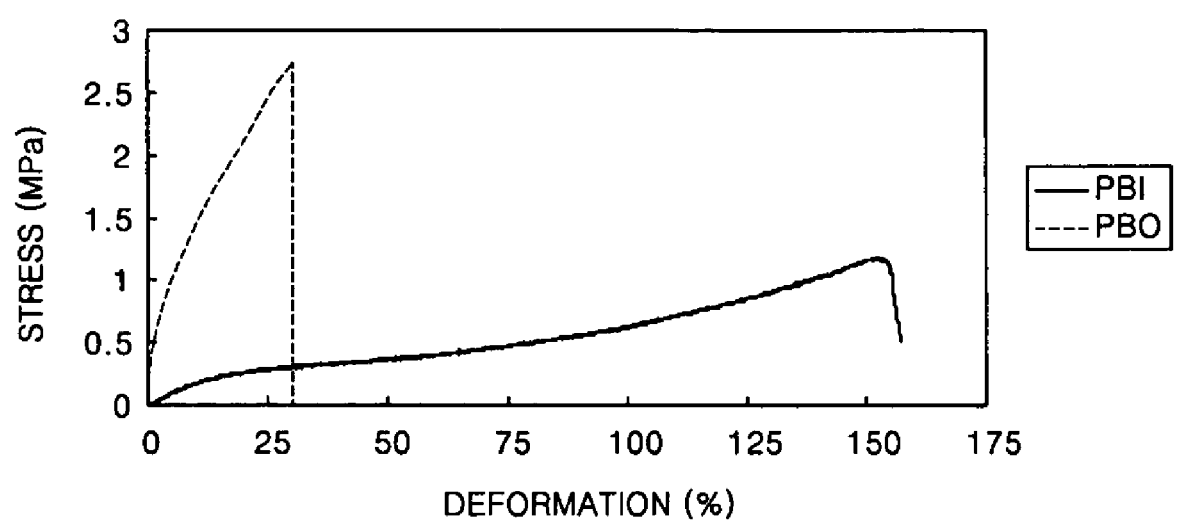
FIG. 5 illustrates the results of mechanical strength tests performed on the polymer electrolyte membranes according to Example 1 and Comparative Example 2.

The results are shown in FIG. 5.

The modulus of Example 1 was 42 Mpa and the modulus of Comparative Example 2 was 2 Mpa. That is, the modulus of Example 1 was at least 20 times greater than that of Comparative Example 2. This shows that the polymer electrolyte membrane composed of PBI can easily be extended when a small amount of power is applied, which means that dimensional stability is decreased when a cell is assembled and thus product defects occur.

In addition, referring to FIG. 5, the tensile strength of the polymer electrolyte membrane according to an embodiment of the present invention is at least two times greater than that of the polymer electrolyte membrane composed of PBI. Thus, the polymer electrolyte membrane according to an embodiment of the present invention is not easily broken, and it is easy to seal a cell when a cell is assembled.

A polymer electrolyte membrane according to the present invention is manufactured by impregnating a compound represented by formula 1a or 1b with at least one acid. The polymer electrolyte membrane has better ionic conductivity at high temperatures and better mechanical properties than a conventional PBI polymer electrolyte membrane. In addition, the polymer electrolyte membrane has equivalent thermal stability to the conventional PBI polymer electrolyte membrane. Further, since the density of the sites that can bind phosphoric acid is high, the leakage of the phosphoric acid into an electrode can be effectively prevented, thus decreasing the overpotential.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A polymer electrolyte membrane comprising a compound represented by formula 1a or formula 1b and doped with at least one acid,

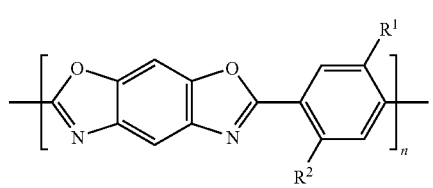

[Formula 1a]

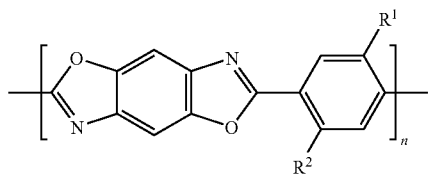

[Formula 1b]

where $R^1$ and $R^2$ are each independently a hydrogen atom, a $C_{1-40}$ alkyl group, a $C_{6-20}$ aryl group, a $C_{1-10}$ alkoxy group, a $C_{7-40}$ alkylaryl group, a $C_{7-40}$ arylalkyl group, a $C_{2-20}$ alkenyl group, a $C_{8-40}$ arylalkenyl, a $C_{2-10}$ alkynyl, a hydroxyl group, a nitro group, or an amino group; and n is an integer between 10 and 100,000, wherein a doping level of the acid is in the range of 600 to 6000%.

2. The polymer electrolyte membrane of claim 1, wherein the at least one acid comprises at least one compound selected from the group consisting of sulfuric acid, phosphoric acid, a derivative of sulfuric acid, and a derivative of phosphoric acid.

3. The polymer electrolyte membrane of claim 1, further comprising 0.001 to 10 parts by weight of methane sulfonic acid based on 100 parts by weight of the polymer electrolyte membrane.

4. A method of manufacturing a polymer electrolyte membrane, the method comprising:
   dissolving a polymer compound represented by formula 1a or formula 1b in a liquid mixture of a high-volatility liquid having a boiling point of 100° C. or less and a low-volatility liquid having a boiling point greater than 100° C.;
   coating the polymer liquid mixture on a support;
   removing the high-volatility liquid from the coating product to form a polymer film; and
   immersing the polymer film in an acid,

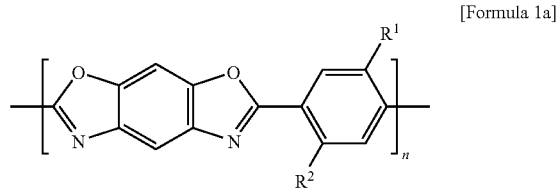

[Formula 1a]

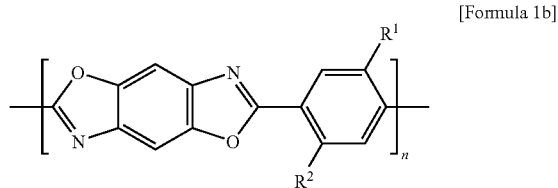

[Formula 1b]

where $R^1$ and $R^2$ are each independently a hydrogen atom, a $C_{1-40}$ alkyl group, a $C_{6-20}$ aryl group, a $C_{8-40}$ alkoxy group, a $C_{7-40}$ alkylaryl group, a $C_{7-40}$ arylalkyl group, a $C_{2-20}$ alkenyl group, a $C_{8-40}$ arylalkenyl, a $C_{2-10}$ alkynyl, a hydroxyl group, a nitro group, or an amino group; and n is an integer between 10 and 100,000.

5. The method of claim 4, wherein the high-volatility liquid comprises at least one compound selected from the group consisting of trifluoroacetic acid, acetone, and tetrahydrofuran.

6. The method of claim 4, wherein the low-volatility liquid comprises at least one compound selected from the group consisting of dimethyl formamide (DMF), n-methylpyrrolidone (NMP), dimethylacetamide (DMAc), dimethyl sulfoxide (DMSO), and methane sulfonic acid (MSA).

7. The method of claim 4, wherein the low-volatility liquid can dissolve the polymer compound and the high-volatility liquid cannot dissolve the polymer compound.

8. The method of claim 7, wherein the weight ratio of the low-volatility liquid to the high-volatility liquid is in the range of 1:9 to 3:7.

9. The method of claim 4, wherein the weight ratio of the polymer compound to the low-volatility liquid is in the range of 1:5 to 1:60.

10. The method of claim 4, wherein the high-volatility liquid is removed by drying at a temperature of 50 to 90° C.

11. The method of claim 4, wherein the high-volatility liquid is removed by drying for 1 hour to 3 hours.

12. The method of claim 4, wherein the acid comprises at least one compound selected from the group consisting of sulfuric acid, phosphoric acid, a derivative of sulfuric acid, and a derivative of phosphoric acid.

13. The method of claim 4, further comprising, before immersing the polymer film in the acid, immersing the polymer film in water or alcohol.

14. The method of claim 13, wherein the alcohol is methanol or ethanol.

15. A fuel battery comprising:
a cathode comprising a catalyst layer and a diffusion layer;
an anode comprising a catalyst layer and a diffusion layer; and
a polymer electrolyte membrane interposed between the cathode and the anode, wherein the polymer electrolyte membrane is the polymer electrolyte membrane of claim 1.

16. A fuel battery comprising:
a cathode comprising a catalyst layer and a diffusion layer;
an anode comprising a catalyst layer and a diffusion layer; and
a polymer electrolyte membrane interposed between the cathode and the anode, wherein the polymer electrolyte membrane is the polymer electrolyte membrane of claim 2.

17. A fuel battery comprising:
a cathode comprising a catalyst layer and a diffusion layer;
an anode comprising a catalyst layer and a diffusion layer; and
a polymer electrolyte membrane interposed between the cathode and the anode,
wherein the polymer electrolyte membrane is the polymer electrolyte membrane of claim 3.

18. A polymer electrolyte membrane made by the method of claim 4.

19. A polymer electrolyte membrane comprising a compound represented by formula 1a or formula 1b and doped with at least one acid,

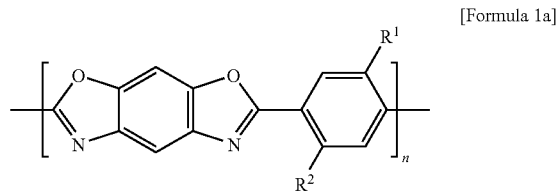

[Formula 1a]

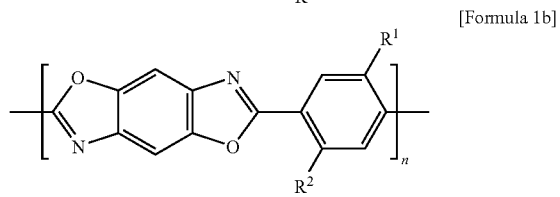

[Formula 1b]

where $R^1$ and $R^2$ are each independently a $C_{1-40}$ alkyl group, a $C_{6-20}$ aryl group, a $C_{1-10}$ alkoxy group, a $C_{7-40}$ alkylaryl group, a $C_{7-40}$ arylalkyl group, a $C_{2-20}$ alkenyl group, a $C_{8-40}$ arylalkenyl, a $C_{2-10}$ alkynyl, a hydroxyl group, a nitro group, or an amino group; and n is an integer between 10 and 100,000.

* * * * *

UNITED STATES PATENT AND TRADEMARK OFFICE
CERTIFICATE OF CORRECTION

PATENT NO.         : 7,727,653 B2                                                          Page 1 of 1
APPLICATION NO. : 11/340565
DATED              : June 1, 2010
INVENTOR(S)        : Chung-kun Cho et al.

It is certified that error appears in the above-identified patent and that said Letters Patent is hereby corrected as shown below:

Column 12, line 38, change "$C_{8-40}$ alkoxy group" to --$C_{1-10}$ alkoxy group--.

Signed and Sealed this

Fourteenth Day of September, 2010

David J. Kappos
*Director of the United States Patent and Trademark Office*